United States Patent [19]

Fujioka et al.

[11] Patent Number: 4,703,262
[45] Date of Patent: Oct. 27, 1987

[54] MOUNTING STRUCTURE FOR SPINDLE ORIENTATION MAGNETIC SENSOR SYSTEM

[75] Inventors: Yoshiki Fujioka, Tokyo; Hiroshi Tokuoka, Hino, both of Japan

[73] Assignee: Fanuc Ltd, Minamitsuru, Japan

[21] Appl. No.: 821,552

[22] PCT Filed: Apr. 26, 1985

[86] PCT No.: PCT/JP85/00236
§ 371 Date: Dec. 13, 1985
§ 102(e) Date: Dec. 13, 1985

[87] PCT Pub. No.: WO85/04953
PCT Pub. Date: Nov. 7, 1985

[30] Foreign Application Priority Data

Apr. 26, 1984 [JP] Japan ................................ 59-084633

[51] Int. Cl.$^4$ .................... G01P 3/487; G01B 7/30; B23Q 5/20; F16B 2/00
[52] U.S. Cl. .................................. 324/208; 324/174; 324/226; 403/369
[58] Field of Search .............. 324/207, 208, 226, 228, 324/262, 173, 174, 146, 147; 310/68 B; 403/367-369

[56] References Cited

U.S. PATENT DOCUMENTS

| 3,317,829 | 5/1967 | Kuhrt et al. | 324/208 X |
| 3,565,471 | 2/1971 | Nilsson | 403/369 |
| 4,064,708 | 12/1977 | Breads | 403/369 X |
| 4,345,851 | 8/1982 | Soussloff | 403/369 |
| 4,385,276 | 5/1983 | Bitzel | 324/174 |

FOREIGN PATENT DOCUMENTS

| 113374 | 9/1979 | Japan | 324/208 |
| 56-54523 | 5/1981 | Japan . | |
| 56-97105 | 8/1981 | Japan . | |
| 56-97106 | 8/1981 | Japan . | |
| 904987 | 9/1962 | United Kingdom | 324/262 |
| 517715 | 8/1976 | U.S.S.R. | 403/369 |

Primary Examiner—Gerard R. Strecker
Attorney, Agent, or Firm—Staas & Halsey

[57] ABSTRACT

A magnetic sensor system for spindle orientation in which a magnetic body is attached to a rotating spindle and a magnetic signal from the magnetic body is detected by a sensing unit arranged on a mechanically stationary member to detect the rotational position of the spindle. A pair of wedge-shaped, annular fastening elements are fitted onto the circumferential surface of the spindle in such a manner that tapered portions thereof oppose each other, thereby rigidly securing an accommodating ring and a cover body together on the spindle.

20 Claims, 11 Drawing Figures

MOUNTING STRUCTURE FOR SPINDLE ORIENTATION MAGNETIC SENSOR SYSTEM

BACKGROUND OF THE INVENTION

This invention relates to a magnetic sensor system for spindle orientation whereby the spindle of a machine tool or the like is stopped at a fixed position in a contactless manner. More particularly, the invention relates to a mounting structure for mounting a magnetic body of the magnetic sensor system on the spindle.

A magnetic sensor system for spindle orientation in which the spindle of a machine tool or the like is stopped at a fixed position in a contactless manner, ordinarily is adapted to extract a position feedback signal from a magnetic sensor directly connected to the spindle and to process the signal by an orientation circuit. The position feedback signal is for the purpose of detecting the position of a rotary shaft. A magnetic signal from a magnetic body attached to the spindle at a prescribed position thereon is detected and extracted by a sensing unit arranged on a mechanically stationary member.

FIGS. 6(A), (B) are diagrams showing an example of the arrangement of a position detector for detecting the position of a spindle 1. FIG. 6(A) is a side view and FIG. 6(B) is a cross-sectional view along the cross-section; of the rotating spindle 1.

In order to stop a prescribed portion of the spindle 1 at a fixed position, the position detector comprises a magnetic body 10 attached to the spindle at a rotational angle which is the same as that of the prescribed portion, and a sensing unit 11 for producing a magnetic signal delivered to an orientation circuit 12. As shown in FIG. 6(C), the magnetic body 10 has two rubber magnets 10b of triangular cross section accommodated in a case 10a, and is mounted in such a manner that the magnetizing strength thereof changes continuously from the S pole to the N pole in the direction of spindle rotation (the direction of the arrow). The sensing unit 11 is mounted on a mechanically stationary member in the neighborhood of the spindle 1 to confront the magnetic body 10 across a distance of 1 to 2 mm.

As shown in FIG. 6(C), the sensing unit 11 is composed of three saturable reactors $SRA_1$, $SRA_2$, $SRA_3$ arranged side by side in a case 11a. Each saturable reactor has a core CR on which coils $L_1$, $L_2$ are wound to produce mutually opposing polarities, as shown in FIG. 6(D). The coils $L_1$, $L_2$ have a common terminal TA to which a high-frequency signal from the orientation circuit 12 is applied, as well as respective terminals TB, TC from which a magnetic signal corresponding to the position of the magnetic body 10 is produced.

FIG. 6(E) is a waveform diagram of output signals PDS, ASV obtained from the orientation circuit 12 when the magnetic body 10 and sensing unit 11 are positionally related as shown in FIG. 6(C).

ASVa, PDS, ASVb indicate output voltage waveforms obtained from the sensing unit and corresponding to the respective saturable reactors $SRA_1$, $SRA_2$, $SRA_3$ of the sensing unit 11. The orientation circuit 12 is so arranged that the sensing circuit produces an output voltage of zero as the center line of the magnetic body 10a successively achieves coincidence with the center lines of the saturable reactors $SRA_1$, $SRA_2$, $SRA_3$, a positive output voltage at a position near the left of each center line, and a negative output voltage at a position near the right of each center line. Therefore, ASVa, PDS and ASVb have an overall voltage waveform that crosses the zero level. The voltage signal PDS is used as a rotation deviation signal of the spindle 1. A voltage signal ASV is the sum of a voltage waveform obtained by shifting the phase of the sensing circuit output ASVa by 180°, and the output ASVb of the sensing circuit. The voltage signal ASV is used as a signal indicating that the prescribed portion of the spindle 1 has arrived near the fixed position.

Though the position of the spindle 1 may be detected by arranging the position detector in the foregoing manner, the output signal ASV can be outputted as the voltage waveform shown in FIG. 6(F) besides the form shown in FIG. 6(E). Details regarding the construction of a spindle position detector of this type are disclosed in Japanese patent application Laid-Open Nos. 56-54523, 56-97105, 56-97106, etc., all of which were filed and laid-open in Japan.

When cutting aluminum or a light alloy such as Duralumin with a machine for cutting workpieces, rotating the spindle of the machine at a low velocity is undesirable as it causes the cut surface of the workpiece to take on a roughened appearance and to exhibit a dull color. However, if the workpiece (such as a light alloy) is cut by rotating the machine spindle at a high velocity of, e.g., 10,000 to 20,000 rpm, the cut surface exhibits luster, even without polishing after cutting, thereby enabling an improvement in the condition of the cut surface.

Though it has been considered that large mechanical loss accompanies high-velocity rotation of a spindle and that the motor is required to have a high output for such high-velocity rotation, it is known that recent advances in spindle technology have made it possible to reduce mechanical loss and to make do with a motor having a low output, even when rotating a spindle at a high velocity.

Thus, since higher spindle velocities make it possible to obtain an excellent cut surface and lead to a more compact machine and motor, the tendency recently is to use ever higher spindle velocities.

However, with the conventional magnetic sensor system for spindle orientation, the magnetic body 10 is attached to a portion on the circumference to the spindle 1, as shown in FIGS. 6(A), (B), in order to detect the rotational position of the spindle. The result is a sound produced as the magnetic body cuts through the wind during rotation of the spindle. In addition, as the spindle 1 is rotated at ever higher velocity, the harmful influence of this effect is promoted and it also becomes necessary to improve the strength at which the magnetic body 10 is attached to the spindle 1.

SUMMARY OF THE INVENTION

The present invention has been devised to solve the foregoing problems encountered in the prior art, and its object is to provide a magnetic sensor system for spindle orientation having a magnetic body which will not produce a sound by cutting through the wind at high speed rotation of a rotary shaft, and which can be rigidly attached to the spindle.

According to the present invention, there is provided a magnetic sensor system for spindle orientation in which a magnetic body is attached to a rotating spindle and a magnetic signal from the magnetic body is detected by a sensing unit arranged on a mechanically stationary member to detect the rotational position of the spindle, the system comprising a pair of wedge-shaped, annular fastening elements fitted onto the circumferential surface of the spindle in such a manner that their tapered portions oppose each other, an accommodating ring having a first cut-out portion on an inner circumferential side thereof for receiving these fastening elements and a second cut-out portion on an outer circumferential side thereof, and formed to include an accommodating portion for accommodating the magnetic body, and an annular cover body having a first projection which projects at a position corresponding to the first cut-out portion for sliding the fastening elements axially along the circumferential surface of the spindle, and a second projection for being fitted into the second cut-out portion, the magnetic body being attached to the spindle by fixedly securing the accommodating ring and the cover body together on the spindle.

By implementing the present invention, there can be provided a durable magnetic sensor system for contactless spindle orientation capable of withstanding high-speed rotation and of dealing well with noise, which system will have no ill effect upon a spindle rotating mechanism.

DETAILED DESCRIPTION OF THE PREFERRED EMBODIMENT

Figure 1:
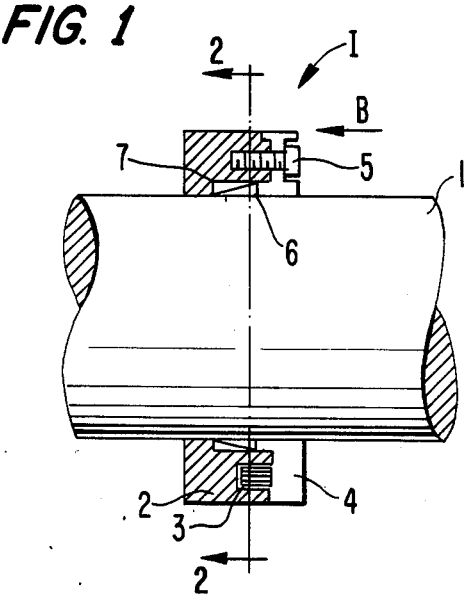
FIG. 1 is a sectional view illustrating a magnetic body mounting structure in a magnetic sensor system for spindle orientation according to the present invention.
Figure 2:
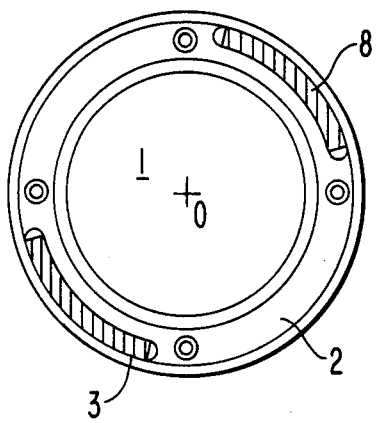
FIG. 2 is a sectional view in which a section taken along line 2—2 of FIG. 1 as seen from the B.

An embodiment of the present invention will now be described in detail in conjunction with the drawings. FIG. 1 is a sectional view illustrating a magnetic body mounting structure of a magnetic sensor according to the present invention; FIG. 2 is a sectional view of a section taken along line 2—2 of FIG. 1 as; and FIG. 3 is a side view as seen from the B direction.

Figure 4:
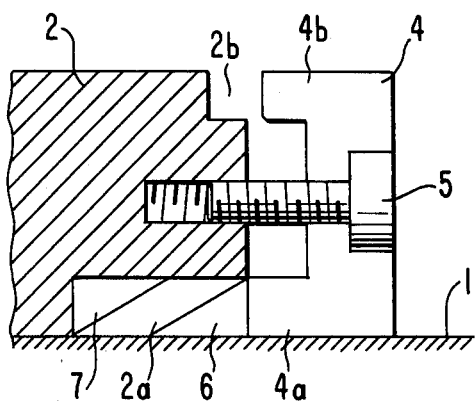
FIG. 4 is a partial sectional view for describing a magnetic body mounting process.

In the Figures, numeral 1 denotes a spindle serving as a rotary shaft, and numeral 2 represents an accommodating ring equipped with an accommodating portion for receiving a magnetic body 3. The accommodating ring 2 is formed to have an inner diameter nearly equal to the diameter of the spindle 1 and has a first cut-out portion 2a on its inner circumferential side and a second cut-out portion 2b on its outer circumferential side (FIG. 4). Numeral 4 designates an annular cover body fixedly secured to and integrated with the accommodating ring 2 on the circumferential surface of the spindle 1 by bolts 5. The annular cover body is formed to include a first projection 4a on the side thereof facing the circumferential surface of spindle 1, and a second projection 4b fitted into the second cut-out portion 2b on the outer circumferential side of the accommodating ring 2. Numerals 6, 7 denote a pair of wedge-shaped, annular fastening elements fitted onto the circumferential surface of the spindle 1 in such a manner that their tapered portions oppose each other.

Figure 3:
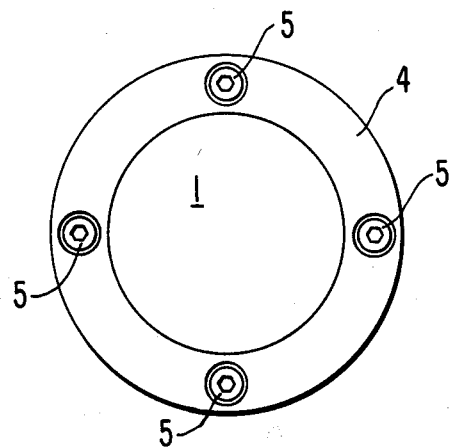
FIG. 3 is a side view of FIG. 1 as seen from the direction of arrow B.

As shown in FIG. 3, the accommodating ring 2 is fixedly secured to and integrated with the cover body 4 by the bolts 5 provided at four locations on the cover body 4. When this is carried out, the fastening elements 6, 7 are urged into the first cut-out portion 2a of accommodating ring 2, thereby enabling the magnetic body 3 inside the accommodating ring 2 to be fixedly secured at a prescribed position on the circumferential surface of the spindle 1, as clearly shown in FIG. 2. However, a force imbalance will act upon the magnetic body 3 as the spindle 1 rotates if the spindle is provided with the magnetic body 3 solely at the prescribed position. Accordingly, balance is achieved by providing an attracting magnet 8 at a position symmetrically located with respect to the magnetic body 3, taking the cener line 0 of the spindle as center. It should be noted that any object having a mass that will balance the magnetic body 3 will suffice, and this object need not necessarily be the magnet 8.

A rubber magnet or a magnet made of plastic and exhibiting flexibility perferably is used as the magnetic body 3.

The structure for mounting the magnetic body 3 in the magnetic sensor system of the present invention will now be described in detail with reference to FIGS. 4 and 5.

Figure 5:
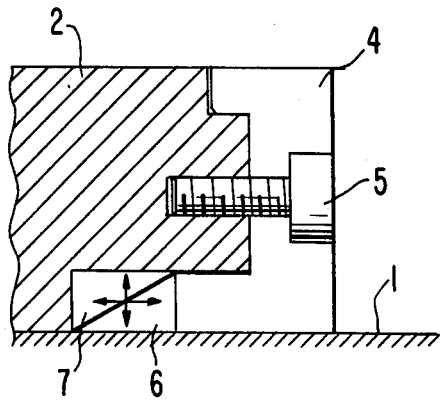
FIG. 5 is a partial sectional view for describing a magnetic body in a nearly mounted condition.
Figure 6A:
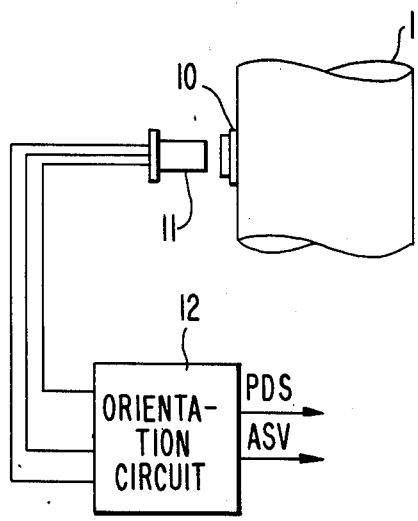
FIG. 6(A) is a diagram showing the arrangement of a magnetic sensor system for spindle orientation according to the prior art.
Figure 6B:
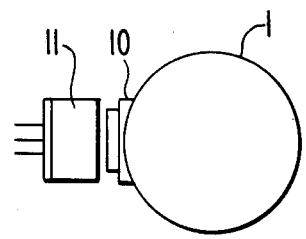
FIG. 6(B) is a cross-sectional view of the rotating spindle 1 of FIG. 6(A)
Figure 6C:
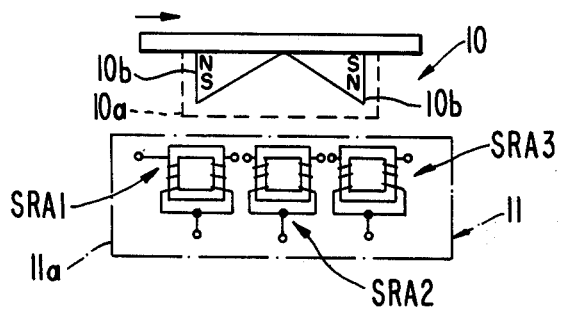
FIG. 6(C) is a detailed diagram of the sensing unit 11 and the magnetic body of FIG. 6(B)
Figure 6D:
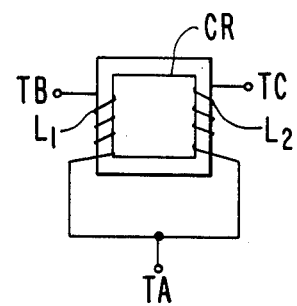
FIG. 6(D) is a detailed diagram of one of the saturable reactors of FIG. 6(C)
Figure 6E:
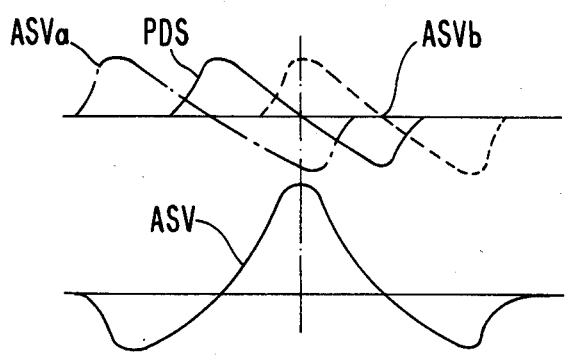
FIGS. 6(E) and 6(F) are waveform diagrams of signals output by the orientation circuit 12 of FIG. 6(A).
Figure 6F:
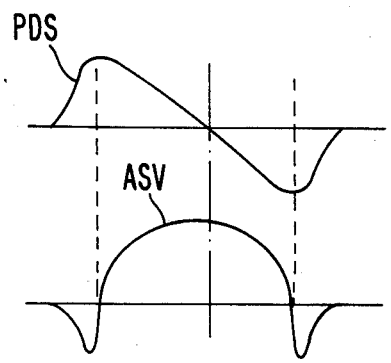

FIG. 4 is a sectional view of the accommodating ring 2 and cover body 4 in the process of being secured to each other, and FIG. 5 is a sectional view showing the accommodating ring 2 and cover body 4 in a state where they are nearly secured to each other. Both views are enlargements of the portion I shown in FIG. 1.

The first cut-out portion 2a of the accommodating ring 2 receives the wedge-shaped, annular fastening elements 6, 7 in such a manner that their tapered portions oppose each other. The accommodating ring 2 is formed to include the cut-out portion 2b into which the second projection 4b of cover body 4 is fitted, as well as female screw portions into which the bolts 5 are screwed. When the cover body 4 is attached to the accommodating ring 2 by the male-threaded bolts 5, the first projection 4a is thrust into the cut-out portion 2a to slide the leading fastening element 6, and the second projection 4b is fitted into the cut-out portion 2b, thereby fixedly securing the accommodating ring 2 to the spindle 1. By thus screwing the bolts 5 into the female screw portions of the accommodating ring 2, the accommodating ring 2 and cover body 4 are substantially secured to each other, as shown in FIG. 5.

When the first projection 4a slides the fastening element 6 axially of the spindle 1, the tapered portion thereof urges the opposing fastening element 7 upward, as is clear from the vectors indicated by the arrows in FIG. 5. At such time an opposing force urges the fastening element 6 downward in the direction of the spindle 1. As a result, the accommodating ring 2 is rigidly secured on the spindle 1 when the bolts 5 are tightened fully.

Further, by forming the accommodating ring 2 and cover body 4 to have identical outer diameters, the outer circumferential surface of the accommodating ring 2 and the outer circumferential surface of the annular cover body 4 can be made to coincide.

By thus fitting the components together, parting of the accommodating ring 2 from the spindle 1 due to centrifugal force produced at rotation, is prevented. A measure for dealing with such separation of the accommodating ring 2 from the spindle 1 is particularly important since a large centrifugal force acts upon the magnetic body 3 and its accommodating ring 2 when the spindle 1 is being rotated at high velocities of from 10,000 rpm to 20,000 rpm. The present invention realizes this measure through a simple structure.

According to the present invention, (1) the accommodating ring 2 of the magnetic body 3 is rigidly secured to the spindle 1 by providing the pair of wedge-shaped, annular fastening members 6, 7 the tapered portions of which oppose each other, and tightly fastening the annular cover body 4.

(2) The second projection 4b formed on the annular cover body 4 is fitted into the cut-out portion 2b formed in the outer circumferential portion of the accommodating ring 2 of magnetic body 3. This prevents the magnetic body 3 and accommodating ring 2 from being separated from the spindle 1 by centrifugal force.

(3) Since the outer circumferential surface of the accommodating ring 2 of magnetic body 3 and the outer circumferential surface of the annular cover body 4 are made to coincide, no noise is produced by air resistance even when the spindle is rotated at a high velocity.

(4) Since the object 8 having a mass equivalent to that of the magnetic body 3 is provided at a location symmetrically located with respect to the magnetic body 3 with the central axis of the spindle 1 serving as center, a magnetic sensor system can be constructed in which irregular rotation of the spindle 1 does not occur.

Though the present invention has been described in accordance with the illustrated embodiment, the invention is not limited solely to the embodiment but can be modified in various ways in accordance with the gist thereof, without departing from the scope of the claims.

The present invention can be utilized effectively in a magnetic sensor system for spindle orientation in which the spindle of a machine tool or the like is stopped at a fixed position in a contactless manner, the invention being applied to rigidly attach the magnetic body of the magnetic sensor system to the spindle rotatable at high velocity.

What is claimed is:

1. A magnetic sensor system for spindle orientation in which a magnetic body is attached to a rotating spindle and a magnetic signal from the magnetic body is detected by a sensing unit arranged on a mechanically stationary member to detect the rotational position of the spindle, comprising:

a pair of wedge-shaped, annular fastening elements fitted onto the circumferential surface of said spindle in such a manner that tapered portions of said wedge-shaped annular fastening elements oppose each other;

an accommodating ring having a first cut-out portion on an inner circumferential side thereof adjacent the spindle for receiving said wedge-shaped, annular fastening elements, and having a second cut-out portion on an outer circumferential side thereof, said accommodating ring having an accommodating portion for accommodating the magnetic body; and an annular cover body having a first projection which projects at a position corresponding to said first cut-out portion of said accommodating ring, for sliding said wedge-shaped, annular fastening elements axially along the circumferential surface of the spindle, and having a second projection for being fitted into said second cut-out portion of said accommodating ring;

the magnetic body being attached to the spindle by fixedly securing said accommodating ring and said cover body together on the spindle.

2. A magnetic sensor system for spindle orientation according to claim 1, wherein said accommodating ring accommodates an object having a mass equivalent to that of the magnetic body, and wherein the object is positioned so as to be located symmetrically with respect to the magnetic body about the central axis of the spindle.

3. A magnetic sensor system for spindle orientation according to claim 1, wherein said accommodating ring and said cover body are formed to have identical outer diameters, and wherein the outer circumferential surfaces of said accommodating ring and said cover body are coincident and free of irregularities.

4. A magnetic sensor system for spindle orientation according to claim 2, wherein the magnetic body accommodated by said accommodating ring is a magnetic body having flexibility.

5. A magnetic sensor system for spindle orientation according to claim 2, wherein said accommodating ring is formed to include female screw portions spaced apart equidistantly along the circumference of said accommodating ring, further comprising bolts for fixedly securing said cover body to said accommodating ring by screwing said bolts into said female screw portions of said accommodating ring.

6. A magnetic sensor system for spindle orientation according to claim 2, wherein said accommodating ring and said cover body are formed to have identical outer diameters, and wherein the outer circumferential surfaces of said accommodating ring and said cover body are coincident and free of irregularities.

7. A magnetic sensor system for spindle orientation according to claim 3, wherein the magnetic body accommodated by said accommodating ring is a magnetic body having flexibility.

8. A magnetic sensor system for spindle orientation according to claim 6, wherein the magnetic body accommodated by said accommodating ring is a magnetic body having flexibility.

9. A magnetic sensor system for spindle orientation according to claim 3, wherein said accommodating ring is formed to include female screw portions spaced apart equidistantly along the circumference of said accommodating ring, further comprising bolts for fixedly securing said cover body to said accommodating ring by screwing said bolts into said female screw portions of said accommodating ring.

10. A magnetic sensor system for spindle orientation according to claim 6, wherein said accommodating ring is formed to include female screw portions spaced apart equidistantly along the circumference of said accommodating ring, further comprising bolts for fixedly securing said cover body to said accommodating ring by screwing said bolts into said female screw portions of said accommodating ring.

11. A magnetic sensor system for spindle orientation according to claim 4, wherein said accommodating ring is formed to include female screw portions spaced apart equidistantly along the circumference of said accommodating ring, further comprising bolts for fixedly securing said cover body to said accommodating ring by screwing said bolts into said female screw portions of said accommodating ring.

12. A magnetic sensor system for spindle orientation according to claim 7, wherein said accommodating ring is formed to include female screw portions spaced apart equidistantly along the circumference of said accommodating ring, further comprising bolts for fixedly securing said cover body to said accommodating ring by screwing said bolts into said female screw portions of said accommodating ring.

13. A magnetic sensor system for spindle orientation according to claim 8, wherein said accommodating ring is formed to include female screw portions spaced apart equidistantly along the circumference of said accommodating ring, further comprising bolts for fixedly securing said cover body to said accommodating ring by screwing said bolts into said female screw portions of said accommodating ring.

14. A mounting structure for mounting a magnetic body on a spindle for spindle orientation, comprising:
an accommodating ring having an inner circumference capable of sliding over the outer circumference of the spindle, said accommodating ring having an outer circumference and an inner circumference, having a first cut-out portion on the inner circumference, having a second cut-out portion on the outer circumference, and having an accommodating portion for receiving the magnetic body;
first and second wedge-shaped annular fastening elements positioned in the first cut-out portion of said accommodating ring, said wedge-shaped annular fastening elements having tapered portions and being arranged so that the tapered portion oppose each other; and
an annular cover body fixedly secured to said accommodating ring, said annular cover body having a first projection at a position corresponding to the first cut-out portion of said accommodating ring for urging said wedge-shaped annular fastening elements axially along the circumferential surface of the spindle so as to force said wedge-shaped annular fastening elements against said accommodating ring and the spindle, said annular cover body having a second projection at a position corresponding to the second cut-out portion of said accommodating ring.

15. A mounting structure according to claim 14, wherein said accommodating ring includes means for accommodating an object having a mass equivalent to the mass of the magnetic body and for positioning the object on said accommodating ring so that it is located symmetrically with respect to the magnetic body about the central axis of the spindle.

16. A mounting structure according to claim 15, wherein the accommodating portion of said accommodating ring comprises a slot in which the magnetic body is positioned and wherein said annular cover body holds the magnetic body in the slot when said annular cover body is fixedly secured to said accommodating ring.

17. A mounting structure according to claim 16, wherein said accommodating ring and said annular cover body have identical outer diameters, and wherein the outer circumferences of said accommodating ring and said annular cover body are coincident and free of irregularities.

18. A mounting structure according to claim 17, wherein the magnetic body which is positioned in the slot in said accommodating ring is a flexible magnetic body.

19. A mounting structure according to claim 18, wherein the object comprises an attracting magnet.

20. A mounting structure according to claim 17, further comprising bolts for fixedly securing said annular cover body to said accommodating ring.

* * * * *

UNITED STATES PATENT AND TRADEMARK OFFICE
CERTIFICATE OF CORRECTION

PATENT NO. : 4,703,262

DATED : OCTOBER 27, 1987

INVENTOR(S) : YOSHIKI FUJIOKA ET AL.

It is certified that error appears in the above-identified patent and that said Letters Patent is hereby corrected as shown below:

Col. 1, line 28, "tion;" should be --tion--.

Col. 3, line 30, delete "as seen from the B".

Signed and Sealed this

Twenty-sixth Day of April, 1988

Attest:

DONALD J. QUIGG

*Attesting Officer*  *Commissioner of Patents and Trademarks*